A. J. NYE.
COMBINED ELEVATING AND FRUIT CLEANING MACHINE
APPLICATION FILED MAR. 22, 1910.
997,081.
Patented July 4, 191
2 SHEETS—SHEET 1
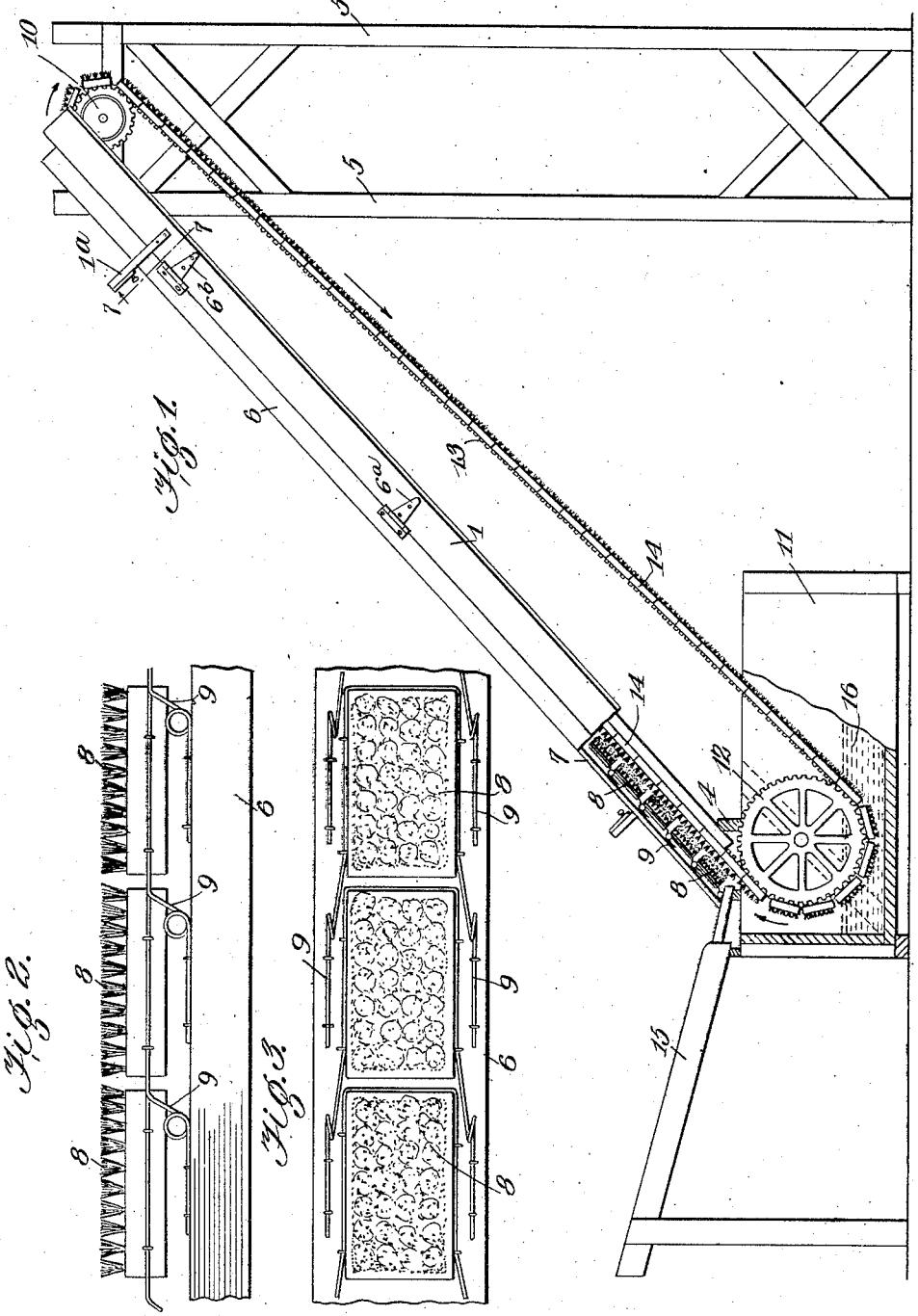
WITNESSES:
Samuel E. Wade
L. A. Stanley
INVENTOR
ALVIN J. NYE
BY Munn & Co.
ATTORNEYS A. J. NYE.
COMBINED ELEVATING AND FRUIT CLEANING MACHINE.
APPLICATION FILED MAR. 22, 1910.
997,081.
Patented July 4, 1911.
2 SHEETS—SHEET 2.
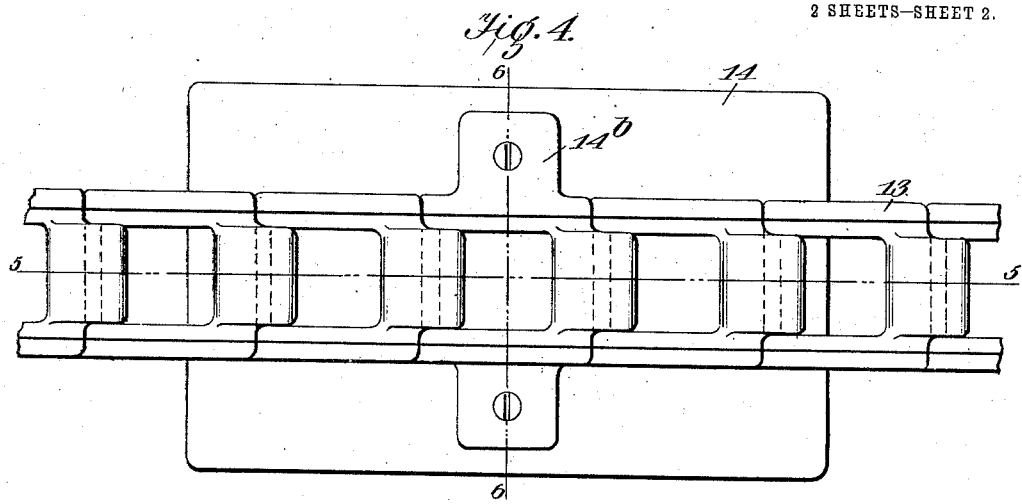
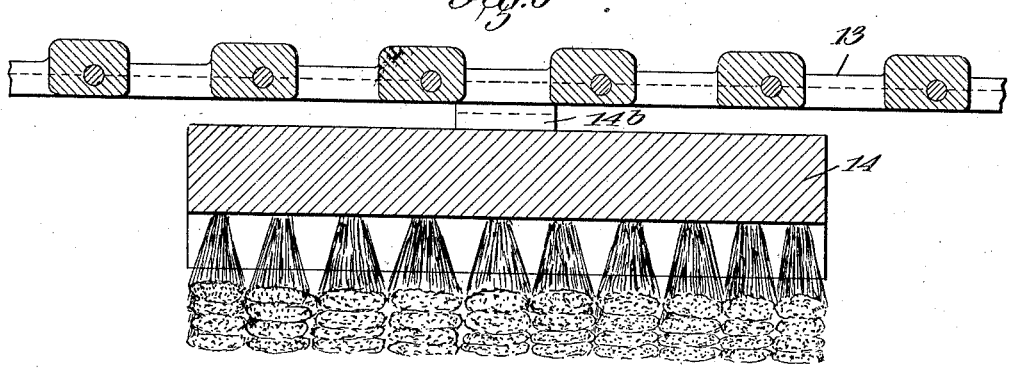
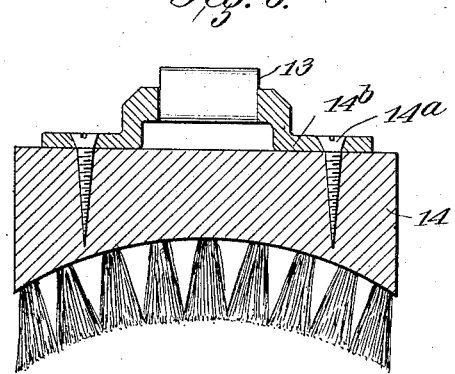
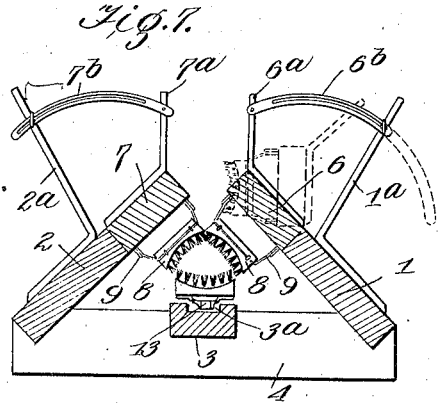
WITNESSES:
Samuel E. Wade.
L. A. Stanley
INVENTOR
ALVIN J. NYE
BY Munn & Co.
ATTORNEYS

UNITED STATES PATENT OFFICE.

ALVIN J. NYE, OF ST. PETERSBURG, FLORIDA.

COMBINED ELEVATING AND FRUIT-CLEANING MACHINE.

997,081.  Specification of Letters Patent.  Patented July 4, 1911.

Application filed March 22, 1910. Serial No. 550,822.

*To all whom it may concern:*

Be it known that I, ALVIN J. NYE, a citizen of the United States, and a resident of St. Petersburg, in the county of Hillsboro and State of Florida, have made certain new and useful Improvements in Combined Elevating and Fruit-Cleaning Machines, of which the following is a specification.

My invention relates to devices for cleaning fruit and for raising or elevating it, and it consists in the combinations, constructions and arrangements herein described and claimed.

An object of my invention is to provide a device by which fruit such as oranges, grapefruit, lemons, etc., may be thoroughly cleaned from scale, dirt or other impurities while being elevated from a lower to a higher floor.

A further object of my invention is to provide a device in which the fruit is held positively in position while being cleaned by a series of spring actuated brushes which conform to the contour of the fruit.

A further object of my invention is to provide means whereby fruit of the smallest size may be as effectively cleaned as the larger fruit, said means being arranged so as to be adjusted to accommodate fruits of various sizes.

Other objects and advantages will appear in the following specification and the novel features of the device will be particularly pointed out in the appended claims.

My invention is illustrated in the accompanying drawings forming a part of this application in which similar reference characters indicate like parts in the several views, and in which—

Figure 1 is a side elevation showing one embodiment of my invention, certain portions being broken away for the sake of clearness. Fig. 2 is a detail side view showing some of the spring brushes. Fig. 3 is a plan view of the brushes shown in Fig. 2. Fig. 4 is a plan view of a portion of the chain showing its attachment to a brush. Fig. 5 is a section on the line 5—5 of Fig. 4. Fig. 6 is a section along the line 6—6 of Fig. 4, and Fig. 7 is a section along the line 7—7 of Fig. 1.

In carrying out my invention I provide a triangular frame consisting of the sides 1 and 2, and the bottom 3, see Fig. 7. The lower end of this framework rests upon the cross member 4, while the upper end rests upon the uprights 5, see Fig. 1. The sides 1 and 2 are inclined as shown in Fig. 7. To the side 1 is hinged a member 6, $6^a$ and $6^b$, while to the side 2 is hinged a similar member 7. Attached to the members 6 and 7 are a series of brushes 8, these brushes being secured on the springs 9 so as to be normally in alinement.

At the top of the frame member 5 is a sprocket wheel 10, while at the lower end of the triangular frame is a reservoir 11 in which is mounted a larger sprocket wheel 12. A sprocket chain 13 travels over the wheels 10 and 12. To the sprocket chain 13 are secured a continuous series of brushes 14 like that indicated in Figs. 4, 5 and 6. These brushes are preferably fastened to the chain by means of screws $14^a$ which pass through lateral extensions $14^b$ on the chain 13. As will be seen from Fig. 7, the sprocket chain 13 passes through a groove $3^a$ in the bottom member 3.

The member 6 is provided with an arm $6^a$ to which is pivoted a slotted arc-shaped arm $6^b$ arranged to be clamped to the arm $1^a$ extending from the member 1, see Fig. 7. The member 7 is similarly provided with the arm $7^a$, and the slotted arc-shaped member $7^b$ arranged to be clamped to the arm $2^a$.

The brushes which I prefer to use are each concave in form as shown in Figs. 6 and 7, the bristles being of the same length and being set in a concave base. With the brushes in the position shown in Fig. 7, it will be seen that the brushes more nearly fit the fruit because of this concave shape.

From the foregoing description of the various parts of the device the operation thereof may be readily understood.

The fruit is placed on the inclined chute 15 and descends by gravity to the bottom part of the elevator. Power is applied to the shaft of the wheel 12 so as to rotate it in the direction indicated by the arrow. The movement of the brushes 14 carries the fruit up by friction against the spring brushes 8. The fruit is engaged by the spring brushes on either side whose pressures have been regulated by adjusting the slotted arms $6^b$ and $7^b$ to the required position for cleaning the particular fruit operated upon. The result is that the fruit is thoroughly brushed on all sides. The fruit constantly tends to descend by gravity but as it rests on the lower brushes which are traveling upwardly it is carried forward with them even though it meets the opposition of the spring brushes and eventually is delivered from the top of the chute in a perfectly clean and polished condition. The apparatus is especially adapted for cleaning oranges, grapefruit, etc., of various sizes. As soon as one orange is started upwardly between the brushes the next orange follows, the fruit feeding automatically into the cleaning device.

The endless chain bearing the brushes descends into the reservoir through the water 16 which cleans the brushes from any dirt or scale which may adhere to them and also supplies the necessary water for the brushing and polishing operation. I am aware that various fruit cleaning machines have been devised in which a movable brush is moved past a series of spring actuated brushes. In some of these devices, however, the very movement of the brushes will crowd out the fruit from between the brushes, but in my device there is absolutely no chance for the fruit to jump out from between the brushes when it is once in. An inspection of Fig. 7 will show that the concave brushes when pressed on the fruit furnish a runway which is approximately the contour of the fruit itself so that all parts of the fruit are brushed effectually since in passing the fruit is turned over and over in all directions. Moreover, while the fruit is being cleaned it is being elevated and the very fact that the fruit tends to descend by gravity keeps it in better contact with the brushes than where the fruit is carried downwardly.

I have found in practice that small oranges of a size scarcely larger than large marbles may be cleaned just as easily and as effectually as oranges of a much greater size. If grape-fruit is to be cleaned the brushes 8 are moved by clamping the arms 6$^b$ and 7$^b$ at the required position.

The members 6 and 7 may be swung backwardly as shown in Fig. 7 in dotted lines when a brush is to be replaced or for any other reason thus enabling the operator to get at any of the brushes of the entire row.

I claim:

1. In a combined fruit cleaning and elevating machine, an inclined frame, an endless carrier on said frame, a series of brushes secured to said endless carrier and forming the bottom of a run way, two rows of spring pressed brushes forming opposed sides of the run way, and means for simultaneously moving all of the brushes of one of said rows toward or away from the brushes forming the bottom of the runway and the opposing row of spring pressed brushes, the movement of the brushes on said endless carrier being from the lower to the upper end of the frame.

2. In a combined fruit cleaning and elevating machine, an inclined frame, sprocket wheels carried thereby, a sprocket chain arranged to run on said sprocket wheels, a series of concave brushes secured to said sprocket chain, side members pivotally secured to said frame, a series of spring pressed concave brushes secured to said side members, means for bringing said spring brushes near said movable brushes to form a runway and means for rotating said sprocket wheels to cause a movement of said movable brushes up said inclined frame relatively to said spring brushes.

3. In a combined fruit cleaning and elevating machine, a reservoir, an inclined frame, a sprocket wheel mounted within said reservoir, a second sprocket wheel mounted at the upper end of said inclined frame, a sprocket chain carried by said sprockets, a series of concave brushes carried by said sprocket chain, a pair of pivoted side members, a series of alined spring pressed concave brushes secured to each side member, means for moving each series of spring pressed brushes simultaneously toward or away from the movable concave brushes and means for retaining the spring controlled brushes in their adjusted positions.

ALVIN J. NYE.

Witnesses:
A. W. FISHER,
A. W. WATSON.